UNITED STATES PATENT OFFICE.

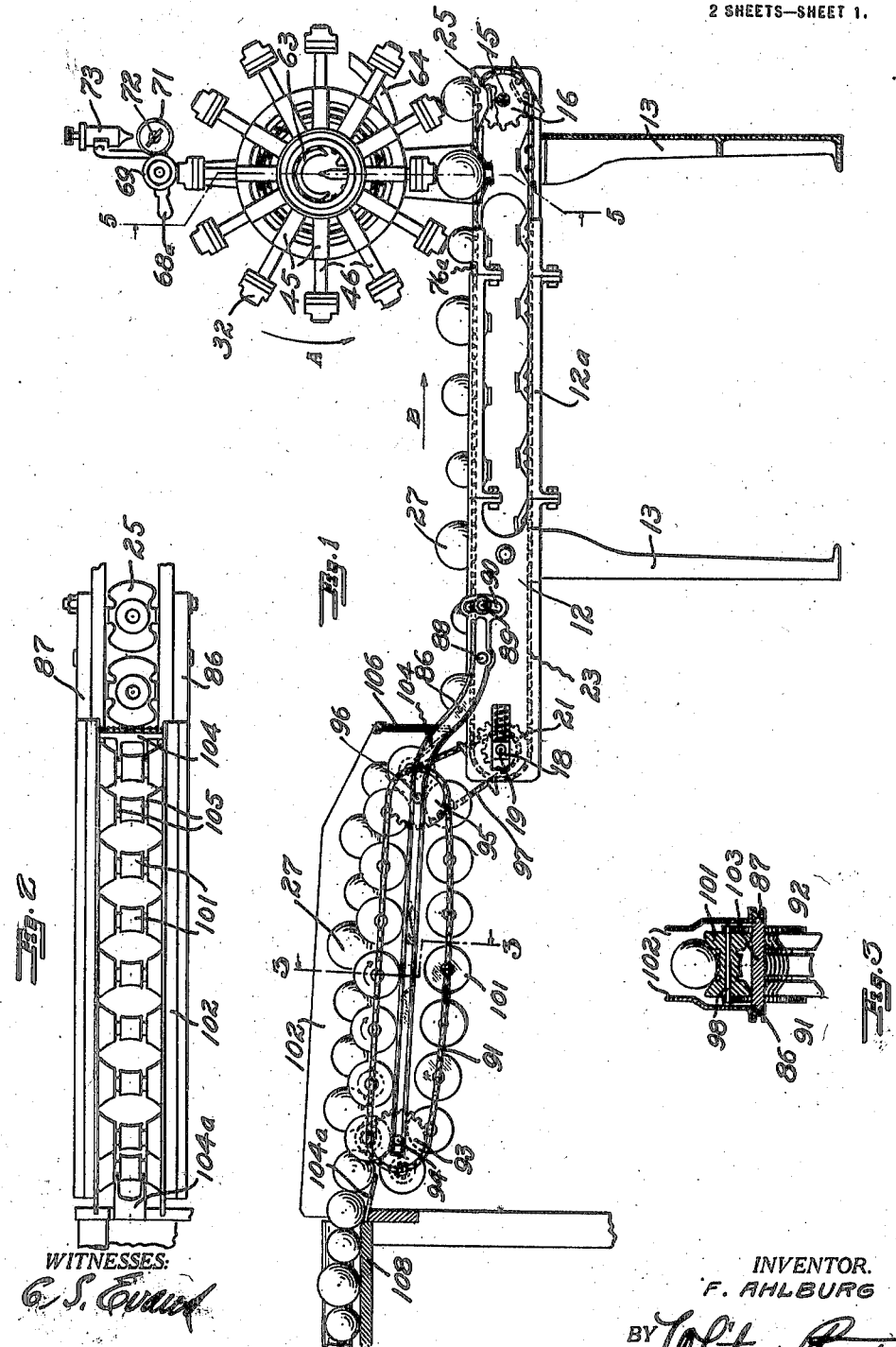

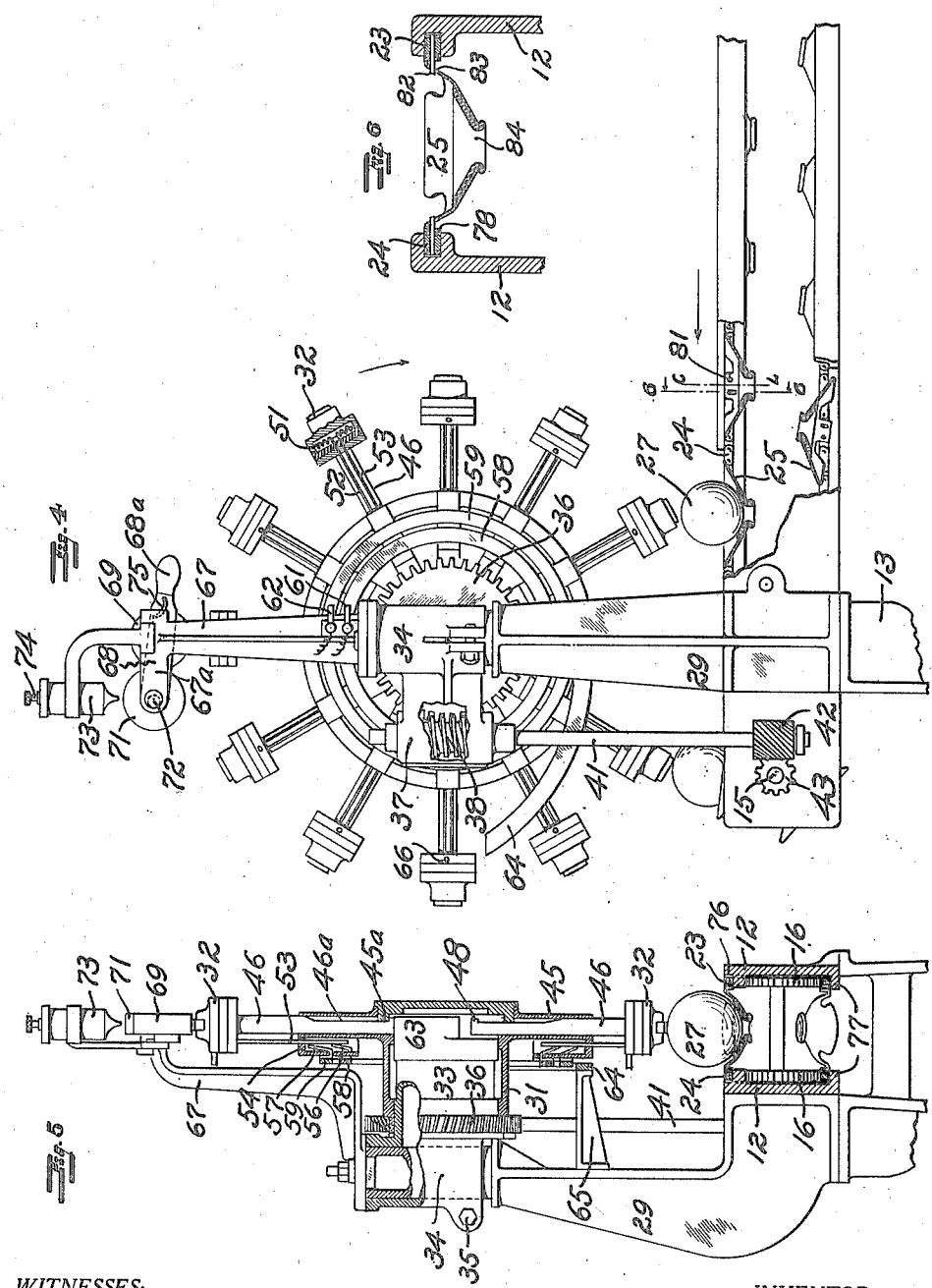

FRANK AHLBURG, OF SAN FRANCISCO, CALIFORNIA, ASSIGNOR TO ELECTRIC FRUIT MARKING CO., OF SAN FRANCISCO, CALIFORNIA, A CORPORATION OF CALIFORNIA.

FRUIT-MARKING MACHINE.

1,284,031.  Specification of Letters Patent.  Patented Nov. 5, 1918.

Application filed November 8, 1916. Serial No. 130,284.

*To all whom it may concern:*

Be it known that I, FRANK AHLBURG, a subject of Germany, and a resident of the city and county of San Francisco, State of California, have invented a new and useful Fruit-Marking Machine, of which the following is a specification.

My invention relates to apparatus for marking names, designs or other delineations on fruit.

An object of my invention is to provide an apparatus for marking fruit.

Another object of my invention is to provide an apparatus for marking fruit which adjusts itself to fruit of varying sizes.

A further object of my invention is to provide an apparatus of the class described in which there are improved means for feeding the fruit to the marking means.

The invention possesses other features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is a front elevation of the machine of my invention, portions being broken away to disclose the construction.

Fig. 2 is a plan view of a portion of the machine.

Fig. 3 is a section taken on the line 3—3 of Fig. 1.

Fig. 4 is a rear elevation of a portion of the machine.

Fig. 5 is an end elevation of a portion of the apparatus, portions being shown in section, better to disclose the construction. The section through portions of the wheel and conveyer is taken on the line 5—5 of Fig. 1.

Fig. 6 is a section taken on the line 6—6 of Fig. 4.

In general terms my fruit marking machine comprises a rotatable die wheel for marking the fruit; means for heating and means for inking the dies; a conveyer for bringing the fruit to the die wheel and including means on the conveyer for positioning the fruit in respect of the dies; and means for feeding fruit to the conveyer.

In the description I shall describe a machine particularly adapted to mark oranges, but it is understood that other fruit such as grape fruit, lemons and, in fact, any fruit which is capable of being marked, can be similarly treated. In marking oranges and similar fruits, it is desirable to ink the hot die and so in addition to heating means, inking means are provided, and in order that the temperature of the die can be maintained substantially constant, I prefer to use a plurality of dies which are successively brought into operative position where each one contacts momentarily with a piece of fruit suitably held to receive the mark.

In detail the apparatus includes a frame comprised of the side plates 12 and supported by the legs 13. Preferably I construct the side plates with a detachable section 12ª so that the frame may be shortened if it is desirable to do so. In one end of the frame is journaled the drive shaft 15 on which is secured a suitable drive pulley, which is not shown. Secured to the shaft 15 between the plates are a pair of sprockets 16. Journaled in longitudinally movable spring pressed blocks 18 arranged at the other end of the plates 12 is a shaft 19 carrying the pair of sprockets 21 which are alined with sprockets 16. Engaging the sprockets is a conveyer consisting of the chains 23 and 24 upon which are arranged a plurality of cups 25 in which the fruit 27 is held.

A bracket 29 is secured to the frame at the end toward which the conveyer carries the fruit and adjustably mounted upon this bracket is the die wheel composed of the hub 31, the dies 32 and the related structure. The die wheel hub 31 is rotatably mounted upon the stud 33 which projects from the split sleeve 34 adjustably arranged upon the upper end of the bracket 29 and locked thereupon by the cap screw 35. Secured to the hub is a worm wheel 36, and in driving engagement therewith and journaled in the housing 37 integral with the sleeve 34 is a worm 38. Splined in the worm is the wheel driving shaft 41 and this shaft is driven from the main shaft 15 by means of the gear 42 in mesh with the gear 43 on the driving shaft. It will be clear from the above that the sleeve 34 carrying the complete die wheel is vertically adjustable upon the bracket 29 without disturbing the driving connection between the wheel and the main shaft 15. While the construction of the die wheel is such as to accommodate itself to a considerable variation in the size of the fruit as will be presently explained, it is advisable to also provide means as just set forth whereby the wheel as a whole may be vertically adjusted.

Spaced circumferentially about the hub 31 are a plurality of sockets 45 in each of which is slidably arranged a shank 46 bearing at its outer end a die 32. The shank and die are prevented from rotating in the socket by flattening one side of the shank as at 46ª and shaping the socket as at 45ª to correspond. A projection 48 on the inner end of the shank serves to retain it in the socket. The dies are thus radially movable upon the die wheel, and the purpose of this movement is to allow the dies to adjust themselves by the force of gravity to different sizes of fruit which are brought under the dies. With large fruit the die shank is retracted into its socket, and with small fruit it is extended. The force of gravity acting on the die causes it to rest with the same pressure upon all fruit irrespective of the size of the fruit. This gravic or gravitational contact between the dies and the fruit is an important factor in the successful operation of my machine since it insures an even mark of the same intensity on each piece.

Means are provided for heating each of the dies. An electric heating element 51 is arranged in the die and suitably insulated therefrom. A pad of asbestos or similar material is preferably disposed between the die and the shank head to confine the heat to the die and avoid the purposeless heating of the shanks. The heating element 51 is supplied with current through the rods 52 and 53 which extend inwardly from the die, parallel to the shank 46 and into the casing 54. Within the casing are two spring brushes 56 and 57, one contacting with each rod. The brush 56 and the corresponding brush in each of the casings spaced about the wheel are connected to the contact ring 58; and the brush 57 and the corresponding brushes in each of the casings are connected to the contact ring 59. Spring brushes 61 and 62 suitably supported on a stationary portion of the machine, connect the rings 58 and 59 with a current supply source. From the above it will be apparent that the heating elements 51 are connected in parallel with the rings 58 and 59 and that by reason of the slidable contact between the rods 52—53 and the brushes 56—57 respectively, the circuit is unbroken in the heating element, irrespective of the position of the shanks in the socket, and that said circuit is maintained throughout the revolution of the die wheel.

Means are provided for inking the hot dies. The dies are inked while passing through the upper portion of the turn of the die wheel and means are provided for positioning the dies so that they are equidistant from the center of the wheel as they pass the inking point. This is accomplished by forming a ledge 63 upon the upper half of the stud 33 so that as the die wheel revolves the inner ends of the shanks 46 bear upon the ledge and are thereby retained in position. The ends of the ledge are preferably beveled as shown in Fig. 1 and in order to avoid destructive contact of the shank ends with the ledge, a cam 64 mounted on the bracket 65 is provided so that the dies are forced outwardly in their sockets by contact of the cam with the pin 66 disposed in the side of the die.

The inking mechanism is mounted upon an extension bracket 67 secured to the bracket 29. The bracket 67 is provided with an arm 67ª, on the outer end of which is pivotally mounted a link 68 terminating in a grip 68ª. Mounted on the link 68 are two rollers 69 and 71. Roller 69 is for applying the ink to the die and is rotatable on a fixed shaft. Roller 71 is a feed roller preferably covered with felt or similar substance for supplying ink to the inking roller 69, and is rotatable upon a shaft 72 eccentrically arranged in the link in a well known manner so that by rotating the shaft the distance between the axes of the two rollers can be varied to vary the pressure between the contacting surfaces of the rollers. An ink cup 73 fitted with a needle valve 74, provides a closely regulatable drip feed for the feed roller. When desired the link is lifted to remove the inking roller from contact with the dies. A slightly buckled spring 75 attached to the extension 67 and to the link 68 provides means for holding the link in the required position to cause the roller to contact with the dies as the wheel revolves or to clear them. The inking of the dies is an important feature of my invention. Only a small amount of ink is required on the hot die and is practically dried before the die contacts with the fruit, where it is combined with the natural wax on the fruit by the action of the hot die. A surplus of ink precludes a clear mark, but by the means above described, the amount of ink distributed to each die is regulated to the utmost nicety.

Means acting in time with the rotation of the die wheel are provided for bringing pieces of fruit into contact with the hot dies.

As already made clear the dies are radially movable upon the die wheel so as to compensate for the different sizes of fruit which are brought under the dies, and to provide for substantially the same pressure of the die upon all the fruit. Since the fruit varies in size and therefore the distance of the die from the center of rotation is also varied, the speed of the die fluctuates; that is, when a die is in contact with a small fruit it is farther from the center and therefore moving faster than a die in contact with a large fruit. The speed of the conveyer is substantially constant, so that means must be provided whereby the variation in speed between dies and conveyer owing to variations in the size of the fruit can be compensated. This is accomplished by the manner of mounting the cups on the conveyer.

The speed of revolution of the die wheel in the direction of the arrow A, Fig. 1, is so related to the speed of the conveyer in the direction of the arrow B that a cup on the conveyer is brought into proper relation with each die as the die wheel revolves. The conveyer preferably consists of the parallel chains 23 and 24 engaging the sprockets 16 and 21. The sprockets are disposed close to the side plates 12 and grooves 76 are formed along the upper edge of the plates in which the chains move. Preferably these grooves run out into rabbets 76$^a$ in that portion of the plates below the die wheel. The lower edge of each plate is provided with a flange 77 upon which the lower reach of the chains travel. Hung at intervals between the chains are the cups 25 in which the fruit is carried to the dies. Preferably the cups 25 are formed of sheet metal, conical in their general form and with lips 78 turned downwardly or folded as shown in Fig. 6. The cups are pivotally mounted upon the chains by the pins 81 which extend from the chains into a bearing formed in the folded lips 78. Considering the cup in motion toward the die wheel, Fig. 4, the pivot pin 81 is located behind the center line C—L of the cup. Obviously then any movement of the cup upwardly about the pivot will tend to slightly slow up the forward travel of a fruit lying in the cup. This pivotal motion of the cup about the pin 81 is limited by a second pin 82 secured in the chain and engaging a slot 83 formed in the folded lip 78 of the cup. The position of the slot 83 is such that on the upper reach of the chain the cup is normally supported in horizontal position as shown in Fig. 4, the permitted pivotal motion being in an upward direction. As the cup bearing the fruit moves into contact with the die, the die rides upward upon the fruit, therefore slowing up somewhat. The adjustment of the cup is such that as the speed of the die decreases, the cup tips upward and backward a small amount, thus slowing up the movement of the fruit to coincide with the movement of the die. In effect therefore, the pivoted cup synchronises the speed of the die and the fruit varying the speed of the fruit in conformity with the variation in the speed of the die caused by its automatic radial adjustment to the varying sizes of fruit. Preferably the cups are provided with a lining 84 of rubber or other suitable material.

Means are provided for feeding fruit of varying size to the conveyer. A frame comprising the two side members 86 and 87 is pivoted to the side plates 12 at 88. This frame is capable of limited adjustment about the pivot 88 and is fixed in the desired position by the screws 89 engaging in the slots 90 formed in extensions of the frame members 86 and 87. A feed conveyer is arranged between the frame members adapted to take one orange at a time from the source of supply and deliver said oranges into the pockets 25 and this feed conveyer is operative upon fruit of varying size.

The feed conveyer consists of two chains 91 and 92 engaging the pair of sprockets 93 fixed upon the shaft 94 at one end of the feed conveyer frame, and the pair of sprockets 95 fixed upon the shaft 96 at the other end of the frame. The shaft 96 is adjacent the shaft 19 and is driven therefrom by the chain 97 running over sprockets fixed on the outer rear end of each of the shafts, so that movement of the cup conveyer is accompanied by a movement of the feed conveyer.

Shafts 98 connect the feed conveyer chains at intervals and upon each shaft is rotatably mounted a concave roll or spool 101. As clearly shown in Figs. 1 and 2, the spaces between the rolls form pockets in which large or small pieces of fruit are held. Preferably guard plates 102 are provided on each side of the feed conveyer, and a base 103 connects the frames 86 and 87 on which base the rolls on the upper reach of the conveyer rotate as they advance. The speed of the feed conveyer and the spacing and position of the rolls bear such a relation to the speed of the cup conveyer and the spacing and position of the cups that as a cup reaches the horizontal position after traveling about the pair of sprockets 21, a piece of fruit falls from between the rolls. In order to insure delivery of the falling fruit into the cup, a forked member 104 is provided which extends downwardly adjacent the cup and the forks of which extend upwardly into grooves 105 formed in the roll body. As the fruit falls from the rolls it passes down the forked member and drops into the cup. A curtain 106 formed of ropes and hanging across the base of the forked member 104 checks a too rapid movement of the fruit and prevents it from bounding or rolling out of the cup. At the opposite end of the feed conveyer a similar forked member 104$^a$ facilitates the delivery of the fruit from the end of the source of supply table 108 to the rolls. The source of supply consists of an inclined belt and a roller in the well known form, and its function is to separate a succession of fruit from a mass of fruit dumped thereon and present said succession of fruit at the receiving end of the feed conveyer where the pieces are picked up one at a time by the rolls.

The feed conveyer has another function which is of importance. By reason of their concave form and their rotation, a piece of fruit lying between two adjacent rolls is rotated as it is carried along and gradually it is turned so that its longitudinal axis becomes its axis of rotation. With oranges and similar fruits and especially lemons the longitudinal axis runs through the stem end and it is desirable that such fruit be presented under the marking dies with the stem end to one side. The action of the concave rolls turns the fruit so that it is deposited in the conveyer cup with the cheek side uppermost.

After being marked by the die, the fruit falls out of the cup as the cup makes the turn about the sprockets 16, and falls into a suitable receptacle not shown.

I claim:

1. In a fruit marking machine, a variable speed die, means for heating the die and means for permitting said die to form a gravic contact with the fruit to be marked.

2. In a fruit marking machine, a variable speed die, means for heating the die, means for bringing fruit to be marked adjacent said die, and means for permitting said die to form a momentary gravic contact with said fruit.

3. In a fruit marking machine, a variable speed die, means for moving fruit to be marked past said die, means for heating said die, means for inking said die and means for permitting said die to form a momentary gravic contact with said fruit.

4. In a fruit marking machine, a die wheel, means for bringing fruit to be marked adjacent to the die wheel, and a die slidably mounted in the die wheel whereby the die is permitted to form a gravic contact with said fruit.

5. In a fruit marking machine, a die wheel, means for moving fruit to be marked past side die wheel, a die slidably mounted on the die wheel, means for heating the die and means for permitting momentary gravic contact between said die and said moving fruit.

6. In a fruit marking machine, a revoluble die wheel, means for moving fruit to be marked past the die wheel, dies slidable on the die wheel arranged to form a momentary gravic contact with the fruit and means for synchronizing the movement of the dies and of the fruit during said contact.

7. In a fruit marking machine, a die wheel, means bringing fruit to be marked adjacent the die wheel, a plurality of dies arranged on the die wheel, means for holding the dies equidistant from the center during a portion of the revolution of said die wheel and means for permitting gravic contact of said dies with said fruit during another portion of the revolution of said die wheel.

8. In a fruit marking machine, a die wheel, means for bringing fruit to be marked adjacent the die wheel, a plurality of dies arranged on the die wheel, means for holding the dies equidistant from the center during a portion of the revolution of said die wheel, means for inking said dies during said portion of the revolution, and means for permitting a gravic contact of said inked dies with said fruit.

9. In a fruit marking machine, a die wheel, means for bringing fruit to be marked adjacent the die wheel, a plurality of dies arranged on the die wheel, means for holding the dies equidistant from the center during a portion of the revolution of said die wheel, means for inking said dies during said portion of the revolution, means for heating said dies and means for permitting a gravic contact between said hot inked die and said fruit.

10. In a fruit marking machine, a die wheel, dies slidably arranged on said die wheel, an electric heating element for heating each die, distributing rings on said die wheel, brushes on said rings, and conductor rods on each of said dies in slidable contact with said brushes for connecting said heating elements in circuit with said distributing rings.

11. In a fruit marking machine, a die wheel, means for moving fruit to be marked past said die wheel, means for separating a succession of fruit from a mass of fruit and delivering said fruit to said fruit moving means, and a die slidably mounted in the die wheel whereby the die is permitted to form a gravic contact with said fruit.

In testimony whereof I have hereunto set my hand at Los Angeles, California, this 28th day of October, 1916.

FRANK AHLBURG.